United States Patent [19]
Hixson

[11] 3,844,175
[45] Oct. 29, 1974

[54] NOISE SOURCE LEVEL DETECTION

[76] Inventor: Elmer L. Hixson, 3103 White Roller Dr., Austin, Tex. 78731

[22] Filed: Feb. 26, 1973

[21] Appl. No.: 336,051

[52] U.S. Cl. .................................. 73/557, 343/6 R
[51] Int. Cl. ............................................ G01h 3/12
[58] Field of Search ................... 343/6 R; 181/.5 AP

[56] References Cited
UNITED STATES PATENTS

| | | | |
|---|---|---|---|
| 3,375,487 | 3/1968 | McDaniel et al. | 181/.5 AP X |
| 3,661,224 | 5/1972 | Allen et al. | 181/.5 AP |
| 3,695,098 | 10/1972 | Kirkland | 181/.5 AP X |

*Primary Examiner*—T. H. Tubbesing

[57] ABSTRACT

The method of measuring the noise emanating from a noisy vehicle in a manner that reduces the measured quantity to a unit value, and hence, independent of any specific distance of vehicle-to-sound detector. The method uses a sound pressure level detector and a range measuring device, such as a radar, the output of the range device continuously compensating the sound pressure level detected for distance, to thereby produce a quantity defined as the noise source level.

10 Claims, 8 Drawing Figures

NOISE SOURCE LEVEL DETECTION

BACKGROUND OF THE INVENTION

1. Field of the Invention

This invention relates to the measuring of sound and more specifically to the measurement of noise emanating from vehicles.

2. Description of the Prior Art

Many cities and states in the United States, as well as political subdivisions in several foreign countries, have ordinaces and laws establishing standards for acceptable noise levels produced by highway vehicles. For example, if a defective muffler produces a noise level in excess of the acceptable standards, then the operator may be fined and the vehicle restricted.

Not all such ordinances and laws are directed at defective mufflers. Many residential communities restrict all types of vehicle traffic that produces noise over the legal standards, regardless of the reason why such noise is produced.

Although these ordinances and laws vary widely, many adopt by reference the standards for measuring noise from highway vehicles as set forth by either The Society of Automative Engineers (SAE) or by The International Organization for Standards (ISO). The SAE currently has three standards which apply to the measurement of noise produced by highway vehicles: SAE Standard J986a, for passenger cars and light trucks; SAE Standard J366 and SAE Standard J672a, for heavy trucks and buses. The ISO describes a measuring procedure in ISO Recommendation R362. These standards for acoustic measurements differ essentially in the spacing of the microphone from the vehicle track or path. The SAE standard specifies 50 feet while the ISO recommendation specifies 7.5 meters (approximately 25 feet).

The ordinances and laws that do not adopt one of these standards, generally differ only in distance requirements. Commonly distance of source to microphone are specified anywhere from about 5 feet to over 75 feet. What is meant by a standard incorporating distance in the standard is that the sound level (normally expressed in decibels) cannot exceed a certain level when measured a given distance away.

One difficulty in taking measurements in accordance with these ordinances and laws is the difficulty in setting up the course where the distance to the noise source is exactly the given distance of the standard. The primary reason for this is that the vehicle may not travel the exact path prescribed by the standard. In addition, the maximum noise may not occur at 90° to the track, which is that measured by the standards.

Another problem is one of design of a vehicle for quiet noise characteristics. Measurement of the noise level from a vehicle at one distance is difficult to relate to the noise level from the vehicle at another distance. Therefore, a vehicle may be designed to be acceptably quiet in performance for one state law, but find itself unacceptable for another's state law merely because measurements are taken at different distances.

It has been discovered that there is a way to characterize noise in a manner independent of distance and that such characterization is more meaningful for the noise of a typical vehicle than terms which falsely assume that vehicle noise is a maximum at the closest point of approach which occurs at a 90° track angle.

A moving vehicle is not a point noise source. Neither, however, is a noisy vehicle a spherical pulsating source radiating into an infinite ideal medium, for which convenient mathematical expressions also exist. However, in the far field of the source, spherical spreading, or $1/r$ dependence of the sound pressure, does appear to exist. Therefore, it may be assumed that these mathetmatical expressions do have meaning under actual conditions.

The acoustical pressure, $p$, from a sinusoidally pulsating spherical source radiating into an infinite uniform medium is given by the formula $P = pr$, wherein, P equals the source pressure at a unit distance and $r$ equals the distance of the measuring point to the source.

When $p$ is measured in decibels referred to $2 \times 10^{-5}$ newtons/meter$^2$, this pressure measurement may be referred to as the sound pressure level (SPL). To develop an expression that takes distance, $r$, into account, a "noise source level" (NSL) may be defined and calculated, as follows:

$NSL = SPL + 20\log_{10}r$.

For microphone distances under a few hundred feet, the effects of atmospheric and ground surface absorption are minimal and wind shear may be disregarded. A noisy vehicle is a complex noise source, but it has been discovered that the NSL value is a duplicative expression that has meaning when measurements are made at different distances (ranges). Hence, microphone placement is not critical in measuring NSL, as with the measuring of SPL.

In addition, when range is measured continuously as the vehicle passes and NSL is plotted versus angle from the track or path of the vehicle, a directivity pattern for the radiated noise is produced. This directivity pattern in terms of NSL is significantly more revealing than plotting SPL.

In the prior art, a track is laid out along which a vehicle passes. One or more microphones are set out a distance from the path provided for in the appropriate ordinance or law. The microphones are each connected to a meter or chart recorder. A logarithmic converter is normally used so that the reading is in decibels. The microphones and meter or chart combination is commonly referred to as a sound level meter. The microphones and meters or charts are then calibrated with a standard noise source. Then the vehicle under test is driven along the test track and the readings are made. Those readings in excess of the standard level indicate that the vehicles under test are too noisy with respect to the ordinance standards.

To supplement the standard sound level meter used in SPL measurements, it is necessary to have an additional type of device to measure NSL. This device may conveniently be a doppler-type radar, of which the common traffic radar is a suitable example. Doppler radar commonly produces an output yielding a velocity term. Hence, distance measurements are directly obtainable through a single stage of integration of this velocity term.

Therefore, it is possible to measure NSL using a microphone, a logarithmic converter to produce the SPL term and a doppler radar, an integrator, and a logarithmic converter to produce the $20\log_{10}r$ term and a summation circuit, to produce NSL. A weighting circuit, such as a filter, an attenuator or an amplifier, may be applied to the microphone signal for spectral shaping or amplitude calibration, as desired.

It is a feature of this invention to provide an improved method of measuring sound levels of the noise produced by a moving vehicle, which method produces a noise characteristic of the vehicle which is independent of the distance from the vehicle at which sound measurements are made.

It is yet another feature of this invention to provide apparatus for measuring noise source levels of the noise produced by a moving vehicle.

It is still another feature of this invention to provide apparatus for plotting the noise produced by a moving vehicle so as to present a truer indication of the actual noise impact than in prior art systems.

SUMMARY OF THE INVENTION

In the preferred method of measuring noise produced by a moving vehicle, the sound pressure level (SPL) is recorded in conventional manner. That is, a microphone, which may be either directional or omnidirectional, is placed at a measuring point a convenient distance from a test track, along which the vehicle to be measured will be driven. The microphone is connected to a logarithmic converter to produce the SPL. Also located at the measuring point is a doppler radar and necessary integration circuits to produce a voltage level proportional to the distance from the vehicle to the measuring point at any given instant of time. The distance, or range, voltage is applied to another logarithmic converter, the output being an adjusting factor for removing distance as a factor when summed with the SPL value. The logarithmic range voltage may be further modified to correct for other than $1/r$ dependence. This summed value is defined as the noise source level (NSL). A reference voltage may be applied to the summer to allow for other reference distances, such as a standard value representing 50 feet or 7.5 meters.

A plot of NSL may be made while the vehicle travels a predetermined portion of the track. This is conveniently done by recording the track position via an angular indication output device attached to the tracking radar. A polar plot produces a chart in terms of polar coordinates, without the need of converting the angular indication output to a linear value. Noise having directivity patterns are recorded by such a plot.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.
In the Drawings.

DESCRIPTION OF PREFERRED EMBODIMENTS

Figure 1:
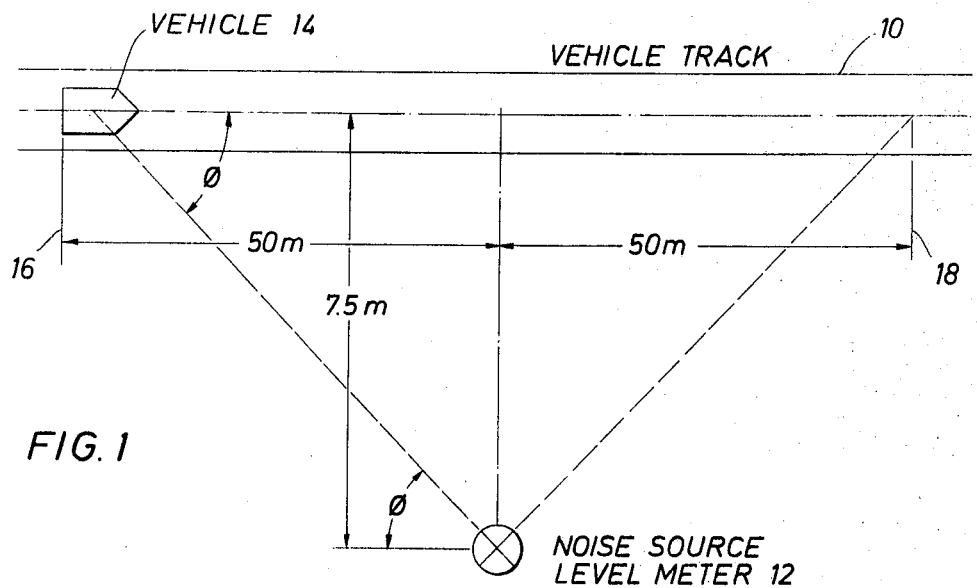
FIG. 1 is a graphical representation of a typical arrangement for taking noise source level measurements in accordance with the present invention.

Now referring to the drawings and first to FIG. 1, a vehicle track 10 is established which is a convenient length for making measurements. For example, in FIG. 1, the length is established as 100 meters. At right angles to track 10 and opposite its mid-point, a measurement point is established which is a convenient known distance from the center of track 10. In FIG. 1, that distance is established as being 7.5 meters. Although this is the distance used in the ISO standards, as will become apparent hereinafter, any conveniently known distance is acceptable provided it is not so far that natural environmental conditions have a material effect on the measurements. The noise source level meter 12 to be hereinafter described is placed on the established measuring point.

Measurements of sound and distance are made with noise source level meter 12 with respect to vehicle 14 as it travels the length of vehicle track 10 from starting point 16 to end point 18. The sound level meter may be General Radio Co, Model 1551-C. It is desirable that the operator of the vehicle maintains the vehicle as close to the center line of vehicle track 10 as possible, but as will become apparent, should vehicle 14 vary from this center line, there is no loss in the accuracy of the measurements made by noise source level meter 12.

Figure 2:
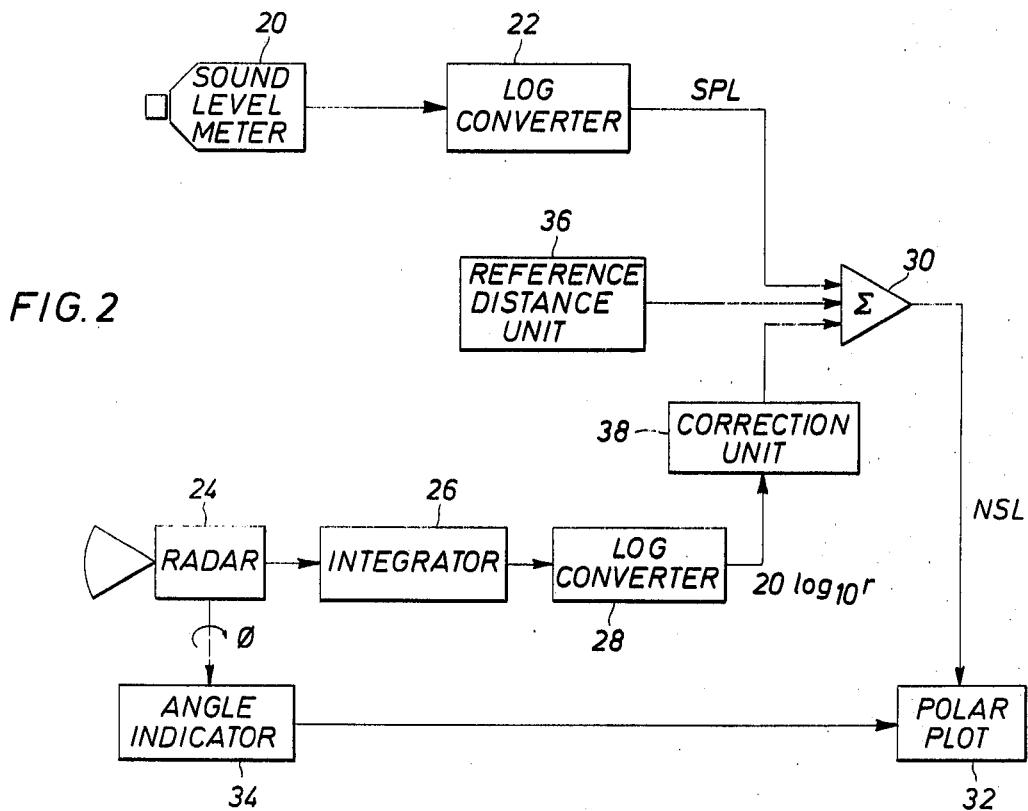
FIG. 2 is a block diagram of a preferred arrangement of a noise source level meter and associated equipment in accordance with the present invention.

FIG. 2 illustrates a typical block diagram of noise source level meter 12. Sound level meter 20 is positioned to receive the noise from vehicle 14 as it moves along track 10. So as to eliminate extraneous noises, microphone 20 may be directive and arranged to swivel to allow it to follow the vehicle as it moves along the test track. When so mounted, it is possible to use a microphone which has a very narrow directivity pattern.

It is not, however, necessary to use a microphone which swivels. A microphone with a wide-angle receiving characteristic may be used instead, so long as the noise from point 16 to point 18 are receivable by the microphone and interfering noises are not present to the extent to discernibly effect the data.

As previously noted, the distance from the track is not critical. However, the distance should be limited to a few hundred feet, or else the effects of atmospheric and ground surface absorption and wind shear would be factors in distorting the sound levels to be measured.

Sound level meter 20 is connected to a logarithmic converter 22 for converting the detected sound level to decibels referred to $2 \times 10^{-5}$ newtons/meter$^2$. Th output from logarithmic converter 22 is the sound pressure level (SPL), which is the measurement most used in ordinances and laws pertaining to sound measurements.

Also located at the measuring point along with sound level meter 20 is doppler radar 24, designed to follow the moving vehicle 14 along track 10. An acceptable doppler radar that may be used is Traffic Master Model 400. As is well known, a doppler radar may be used to develop a voltage which is proportional to velocity of the moving vehicle. It is possible to integrate the velocity voltage value commonly available from a doppler radar and produce a voltage that is proportional to the distance between vehicle 14 and the measuring point. This integration is performed in integrator 26 connected to radar 24. The distance value is also referred to as the range.

The output of integrator 26 is connected to logarithmic converter 28, which produces a value of $20\log_{10}r$, wherein $r$ is the range.

Other radar units that may be used as radar 24 have a distance voltage output terminal in addition to a velocity voltage terminal. SUch radar units may employ a pulse or frequency modulated carrier. An example of the latter is Kimball Products "Whistler Radar."

The output of logarithmic converter 28 is passed through a correction circuit or unit 38. This unit may have a built-in gain factor $\alpha$ so that sound pressure may be corrected for $1/r^\alpha$. Under ideal sound propagating conditions, $\alpha$ will be unity. The correction unit may also have a non-linear network to correct for more complex propagation conditions. The value of $\alpha$ or the non-linear character of the network may be determined by calibration of the system with a known noise source.

A potential is derived by the reference distance unit 36. This unit sets the reference distance for noise source level (NSL) produced by adding to it the output of logarithmic converter 22 and correction unit 38 in summation circuit 30. As was previously shown, the NSL value is an absolute value and is hence independent of distance or range. Therefore, the exact distance of the measuring point from the center line of the vehicle track is not critical.

The output from the summation circuit 30 may be applied to a polar plot 32 for recording the noise source level over the entire length of the vehicle track for which measurements are taken. Radar 24 is mechanically connected to an angle indicator 34 that produces a voltage proportional to the angle $\phi$ of the measurement point to the vehicle track. The voltage output from angle indicator 34 is applied to polar plot 32.

Starting and ending pressure switches may be located at start and end positions 16 and 18 for respectively activating and deactivating the meter circuit. Also, since the radar cannot sense positive and negative velocity, another pressure switch may be located at the midpoint of the track, i.e., the point of closest approach to meter 12 where zero doppler occurs, for reversing the velocity potential.

As illustrated in FIG. 2, the measured quantity is plotted versus vehicle track angle. Alternately, this quantity may be displayed on a simple meter, on a digital display device, or plotted versus time.

Figure 3:
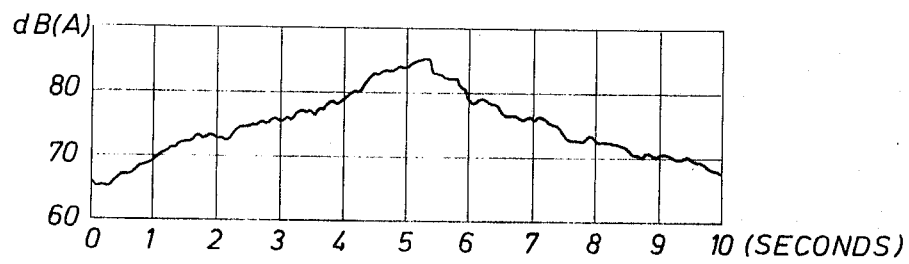
FIG. 3 is a linear diagram of sound pressure level versus time of a moving constant noise source.
Figure 4:
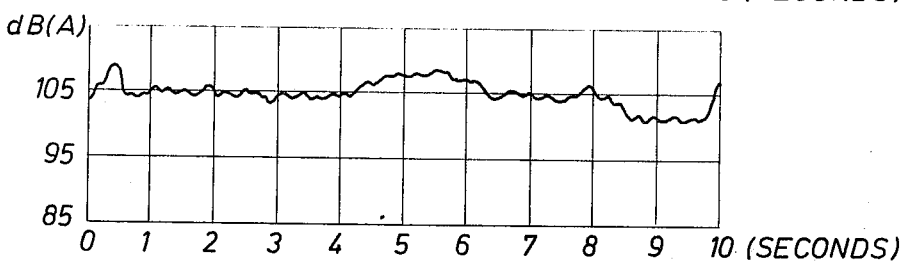
FIG. 4 is a linear diagram of noise source level versus time of the constant noise source used to generate the FIG. 3 diagram.
Figure 5:
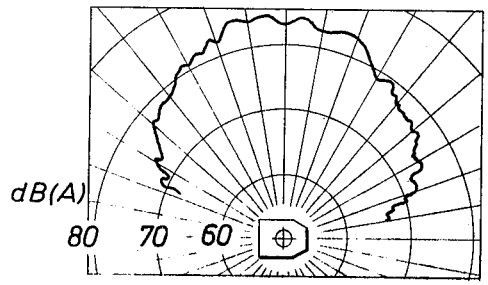
FIG. 5 is a polar diagram of sound pressure level versus angle of a moving constant noise source.
Figure 6:
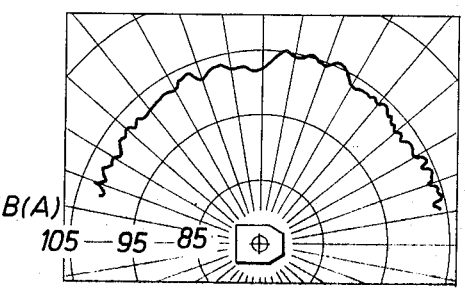
FIG. 6 is a polar diagram of noise source level versus angle of the moving constant noise source used to generate the FIG. 5 diagram.

The noise source level measurements made in accordance with this invention may be compared to sound pressure level measurements by observing together FIGS. 3 and 4; FIGS. 5 and 6; and FIGS. 7 and 8. FIGS. 3 and 4 are respectively SPL and NSL linear plots versus time.

The measurements were made using the geometry illustrated in FIG. 1 and the component connections shown in FIG. 2, with the exception that a linear plotter driven at a constant rate was connected to receive first the SPL output and then the NSL output. Since the measurements were to start at approximately 50 meters, an initial condition corresponding to that range was used for integrator 26. A sound pressure calibrator for a microphone check was used that produced 114 decibels referred to $2 \times 10^{-5}$ N/m$^2$ at 1 KHz. Attenuation adjustment to the microphone was then made to produce a pen recording on a linear plotter of 148 decibels (i.e., 114 decibels plus 34 decibels -- the correction factor for 50 meters to change the SPL reading to NSL). The reference distance unit 36 was set for one meter and the correction unit set for $\alpha = 1$.

A vehicle producing a controlled constant noise emanating in the direction of the receiving microphone was driven the length of the test track so as to cover the distance in about 10 seconds. FIG. 3 shows the results of the recorded measurements for the SPL values resulting from a typical test run. FIG. 4 shows the results of the recorded measurements for the NSL values resulting from a subsequent typical test run.

As may be observed, variation of about 20 decibels over the 100 meter track resulted for the SPL measurements. On the other hand, when the range correction was applied to produce the NSL measurements, only approximately $\pm 3$ decibel variation was observed.

When sound pressure level (SPL) versus angle was recorded as a known omnidirectional noise source passed, the plot of FIG. 5 was produced. The angle information in this run was provided by the output of angle indicator 34. Again, a variation of 20 decibels is noted from the plot. A subsequent run of the same source produced the measured NSL of FIG. 6. In this case, a variation of less than + 2 decibels is noted.

Considering the statistical variability of a noise source and other variations that may have occurred between successive runs, it appears that the sound did indeed approximate spherical spreading and that the noise source level meter did compensate for it.

Figure 7:
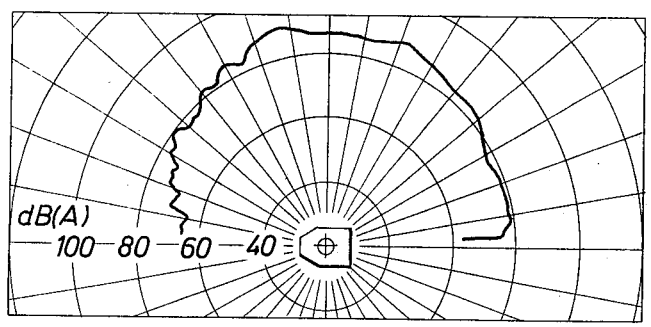
FIG. 7 is a polar diagram of sound pressure level versus angle of a moving noise source having directivity characteristics.
Figure 8:
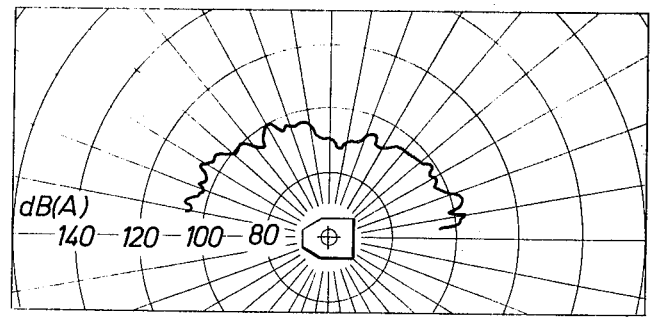
FIG. 8 is a polar diagram of noise source level versus angle of the moving noise source having directivity characteristics used to generate the FIG. 7 diagram.

FIGS. 7 and 8 show the advantage of using NSL and a polar directivity pattern. In these test runs, a horn from an ancient Volkswagen was used as the noise source.

The recording of sound pressure level (SPL) in FIG. 7 resulted in a maximum of 84 dB(A) at a track angle of 75 degrees. This measurement corrected to one meter produces an NSL of 98 dB(A). Now referring to FIG. 8, it may be observed that the NSL at 75 degrees is 98 dB(A), verifying the results of FIG. 7. However, FIG. 8 also shows that at track angles of 15°, 30° and 160°, the NSL is 106 dB(A), or 8 dB higher than that observed by measuring only SPL. Hence, because of the directional nature of such a source, an objectionable noise may actually pass an SPL test based on an SPL measurement and fail a test based on an NSL measurement. By plotting NSL versus track angle, not only is the dependency on geometry removed from the reading, but the directional nature of the source is determined and directional objectionable noises are identified.

While the invention has been described with reference to a specific embodiment, the description is illustrative and not to be construed as limiting of the scope of the invention. For example, any means suitable for producing the range or distance information may be used in lieu of doppler radar 24. This and various other modifications and changes may occur to those skilled in the art without departing from the spirit and scope of the invention. In addition, the use is not limited to highway vehicles but may be applied to the other land, water or airborne vehicles, as well.

What is claimed is:

1. The method of measuring noise from a moving vehicle, comprising the steps of:

detecting at a measuring point with a sound level measurer the noise emanating from a vehicle moving along a straight path a known distance from said point;

logarithmically converting the detected sound level to decibels referred to $2 \times 10^{-5}$ newtons/meter$^2$;

detecting at the measuring point with doppler radar means the timing of doppler returns from said vehicle and calculating from the known distance of said path to said point the range of said point to vehicle during the sound level detection;

logarithmically converting the range information as follows: $20\log_{10}r$, where $r$ equals range in meters; and adding the logarithmically converted detected sound level to the logarithmically converted range to produce a noise source level.

2. The method as set forth in claim 1, and including producing a reference distance potential indicative of a standard reference distance; and adding said reference distance potential to said logarithmically converted detected sound level and said logarithmically converted range.

3. The method as set forth in claim 2, and including weighting the output detected by said sound level measurer.

4. The method as set forth in claim 2, wherein said detecting at the measuring point is performed with a directional microphone.

5. The method as set forth in claim 2, and including correcting said logarithmically converted range for other than spherical spreading.

6. The method as set forth in claim 2, and including continuously plotting the output while the vehicle moves along the path.

7. The method as set forth in claim 6, wherein said plotting is performed relative to polar coordinates, the location of the plot corresponding to the direction of the vehicle with respect to the measuring point.

8. The method as set forth in claim 6, wherein said radar means angularly tracks said moving vehicle and produces angular position information and wherein said plotting is performed with respect to polar coordinates using said angular position information therefor.

9. The method of measuring noise from a moving vehicle, comprising the steps of:

detecting at a measuring point the sound pressure of the noise emanating from the vehicle; and multiplying said sound pressure by range information to produce an output propotional to source pressure strength normalized to unit distance.

10. The method as set forth in claim 9, and including continuously polar plotting the results of said multiplying versus the angle of detection to moving vehicle.

* * * * *